United States Patent
Dock

[11] 3,906,716
[45] Sept. 23, 1975

[54] CONNECTOR LINK

[76] Inventor: Mortimer Russell Dock, P.O. Box 231, Blackstone, Va. 23824

[22] Filed: Aug. 30, 1974

[21] Appl. No.: 502,024

[52] U.S. Cl. ................................................ 59/85
[51] Int. Cl.² ........................................ F16G 15/04
[58] Field of Search ........................... 59/85, 86, 93

[56] References Cited
UNITED STATES PATENTS

| | | | |
|---|---|---|---|
| 2,226,755 | 12/1940 | Ehmann | 59/86 |
| 2,353,939 | 7/1944 | Staats | 59/85 |
| 2,353,940 | 7/1944 | Staats | 59/85 |

FOREIGN PATENTS OR APPLICATIONS

| | | | |
|---|---|---|---|
| 1,156,282 | 10/1963 | Germany | 59/85 |

Primary Examiner—C. W. Lanham
Assistant Examiner—Gene P. Crosby

[57] ABSTRACT

This invention relates to a connector link for attaching lengths of chain together or for attaching fittings to the ends of chain, wire, rope, etc., which link may be readily assembled and disassembled, said link comprising two identical end members and a transversely disposed center anchoring member. The novelty of this invention resides in its construction, which consists of two identical parts secured in mated assembly by a transverse pin member extending therethrough, said identical parts being so formed that the stress on the link is borne by opposing central portions of said parts, and the pin serves merely to retain the parts together and to secure the outer end of each half link to the central portion of the other half.

7 Claims, 6 Drawing Figures

US Patent    Sept. 23, 1975    3,906,716
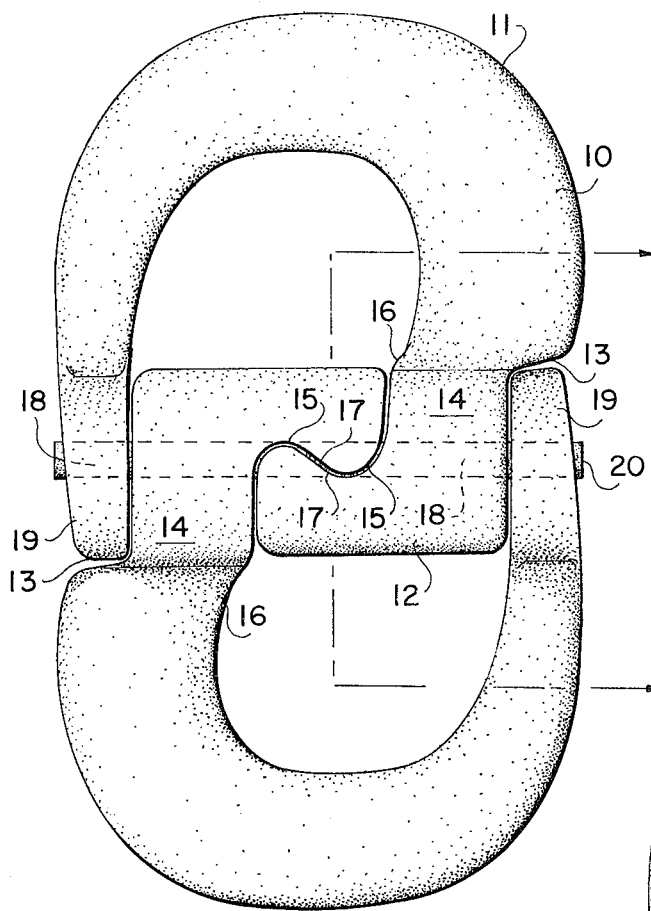
FIG. 1
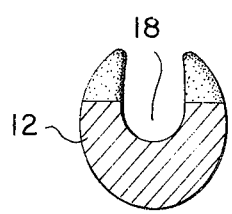
FIG. 3
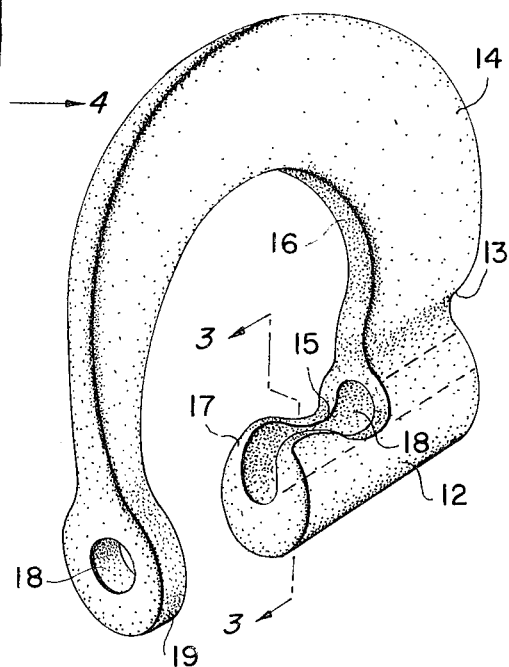
FIG. 2
FIG. 6
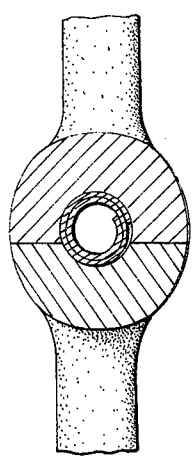
FIG. 4
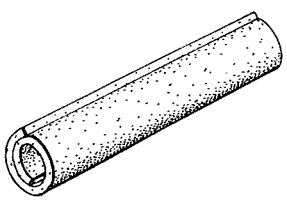
FIG. 5

CONNECTOR LINK

This invention relates to connector means for attaching lengths of chain together and for securing fittings such as hooks, rings, etc. onto the ends of chain or wire rope. There have been numerous connector devices in the past, and the field of art is crowded with teachings of various structures and methods of operation. Most of such devices, however, have consisted of a pair of end pieces secured together by a transverse pin extending through a center bushing or thimble or other spacer means disposed between the legs of said mated end pieces, said pin continuing its extension through the said legs of said end pieces. When the connector device was subjected to longitudinal pull, as by the lifting of a load on the hook and chain, the entire stress was placed upon the transverse pin. Such pin, so disposed, is subjected to severe shearing hazard, and therefore the half-links have been made greatly enlarged in the center portions to accommodate pins of such size as to provide a shear resistance sufficient to meet the test requirements for the chain size to which the link relates.

The link of this invention eliminates the problem of a load stress imposed entirely upon the securing pin. Instead, it provides mating surfaces of the center mass wherein said mating surfaces are brought into abutment upon assembly and provide counter-resistance when the link is subjected to longitudinal pull. These opposed surfaces are subjected to a major part of the stress imposed upon the link, and the connector member or pin is thereby relieved of the tendency to shear and the inherent danger residing in such shearing action.

An additional disadvantage of the prior structures of such connector devices is the fact that the two mated parts are retained in loose, i.e., flexible, relationship and the pin is held in place solely by its tight engagement within the center bushing.

Each common link of chain is by its nature rigid in structure, but since a length of chain is naturally flexible, it requires no flexibility in a connector link to enhance its usefulness. On the contrary, a connector link having the structural rigidity of a common link of chain provides greater strength and security for the joining it effects between two such common links, or between one such link and a fitting such as a hook or ring.

The present invention is maintained rigid by the abutted faces of the center portions, which prevent movement of either half with respect to the other half. For a better understanding of the invention, reference is made to the accompanying drawings, wherein:

FIG. 1 is a top plan of a connector link employing the present invention;

FIG. 2 is a perspective view of one end member of the invention;

FIG. 3 is a cross-section taken on line 3—3 of FIG. 2;

FIG. 4 is a cross-section taken on line 4—4 of FIG. 1, showing optional thickening of the center terminus of each half-link;

FIG. 5 is a perspective view of a type of spring pin suggested for securing the two half-links together; and FIG. 6 is a cross-sectional view of such pin.

Referring more particularly to the drawings:

In FIG. 1, end members 10, 10 are seen in assembled position. Each end member is formed with an arcuate end portion 11, a major leg 12 formed at a point set back, as at 13, from the outer border 14 of said member, and defining an acute curve 15 between the interior border 16 of said half-link and the plane face 17 upon the major terminus of said half-link. Whereas the drawings show the acute relationship of said plane face 17 and said adjacent interior wall 16 achieved by a curve, said acute relationship may be effected by either a curve or an angle.

Channel 18 is formed transversely through the major leg 12 and through the minor leg 19, to accommodate pin 20.

It will be seen from FIG. 2 that channel 18 becomes an open (approximately 180°) groove at the point of the acute curve 15 and along the plane face 17 (shown more clearly in FIG. 2), which abuts a like grooved plane face when two half-links are assembled.

The purpose of the acute curvature at 15 and the resulting obliquity (from the transverse side of the link) of the mating line of the two plane faces, is to provide assured maintenance of assembly when the two halves are subjected to longitudinal pull. The greater the stress exerted on the link, the more tightly will the plane faces of the two center termini abut.

Thus, when the two half-links are assembled together and are secured in assembly by a transverse pin extending through the entire width of the link, and the central abutting surfaces bear the major part of the stress, the minor ends of the half-links serve only to anchor said minor ends in juxtaposed relationship with the major center mass of the respective half-links, and the pin is subjected to minimal stress.

The preferred type of pin for securing the two halves of the link of this invention is a spring type pin sold under the trade name SPIROL. By reason of the spiral formation of sheet steel for a distance of substantially 720° around a longitudinal axis, this pin provides resilience sufficient to permit its entry into a channel of slightly less diameter than the pin, and maintains compression resistance upon the entire outer surface of the pin until it is forcibly removed.

There are other pins which may be used, including various other spring pins and pins having longitudinal ridges and knurled surfaces to effect tight engagement within a channel.

The two plane faces on the termini of the major legs are secured in tight abutment by the engagement of the pin within the channel extending through the major and minor legs of the two half-links, and thus the rigidity of the link is maintained, with undue wear upon the respective parts being thereby prevented.

If desired, the major leg 12 may be formed of somewhat enlarged thickness, thus providing a greater area in the opposed faces of the two mated center faces 17, 17. Such optional enlargement is shown in FIG. 4.

It is unreasonable to believe that an effective link can provide strength sufficient to support the nominal load capacity of chain of the size to which the link is rated, when the sole strength of such link resides in the transverse pin connecting the two halves.

The present structure is believed to constitute a major improvement in this field, both as to simplicity of design, ease of assembly, and security against either breakage or accidental disassembly. Furthermore, the product of this invention conforms to the contour of the common, i.e., the standard, link of chain.

Having thus disclosed my invention, I claim:

1. In a connector link bearing the configuration of a common link of chain and comprising two identical end members, each having a major leg and a minor leg and being retained in secure engagement by a transverse member inserted therethrough, the improvement of centrally disposed abutting plane faces of the said major legs of said two end members, the pressure of said plane faces against each other being increased to move the major ends toward each other upon the imposition of longitudinal stress on said link; said abutting plane faces being disposed obliquely from the lateral axis of said link.

2. The invention of claim 1 wherein the terminus of the minor leg of each said end member is retained in juxtaposed relationship with a set-back upon the outer face of the major leg of said other end member, such termini of said two minor legs being secured by the opposite ends of said transverse member.

3. The invention of claim 1 wherein said transverse member, being a compressible pin, provides inherent resistance to compression when inserted through said channel formed in the lateral axis of said link, thereby eliminating the hazard of accidental disassembly.

4. The invention of claim 1 wherein said link has, upon assembly, substantially the rigidity of such common link, and wherein each of said two identical end members has the inner face of the minor leg of one member juxtaposed against the outer face of the major leg of the other member, said juxtaposed faces being spaced inwardly from the periphery of said link; and each major leg being so formed as to provide a plane face abutting the like plane face of the other of said members, said abutting plane faces being disposed substantially in the lateral axis of said link and providing resistance against separation of said members upon the exertion of longitudinal stress on the assembled link; and means such as a pin laterally inserted therethrough for effecting secure engagement of said two members into a unitary structure.

5. The invention of claim 4 wherein said abutting plane faces bear the load imposed upon such link in service, relieving the said securing pin from shearing stress.

6. The invention of claim 1 wherein said obliquity of said abutting plane faces arises from the acute angle defined by each said face with respect to the adjacent interior wall of said end member.

7. The invention of claim 6 wherein said obliquely directed abutting plane faces provide an increased pressure of said major ends against each other by reason of said obliquity.

* * * * *